United States Patent
Vacquie

(10) Patent No.: US 7,181,249 B2
(45) Date of Patent: Feb. 20, 2007

(54) ANTHROPOMORPHIC MOBILE TELECOMMUNICATION APPARATUS

(75) Inventor: Luc Vacquie, Saint Jean l'Herm (FR)

(73) Assignee: France Télecom, Paris (FR)

( * ) Notice: Subject to any disclaimer, the term of this patent is extended or adjusted under 35 U.S.C. 154(b) by 713 days.

(21) Appl. No.: 10/357,762

(22) Filed: Feb. 4, 2003

(65) Prior Publication Data

US 2003/0220124 A1    Nov. 27, 2003

(30) Foreign Application Priority Data

Feb. 8, 2002    (FR) .................................. 02 01565

(51) Int. Cl.
*H04B 1/38* (2006.01)
*H04M 1/00* (2006.01)

(52) U.S. Cl. .................. 455/563; 455/90.3; 455/575.1; 455/414.4; 455/566; 345/475; 345/158; 707/1; 707/5; 434/350; 434/322

(58) Field of Classification Search ................ 455/563, 455/566, 414.4, 90.3, 569.1, 575.1; 345/475, 345/158, 474; 707/1, 5, 839; 463/42, 46
See application file for complete search history.

(56) References Cited

U.S. PATENT DOCUMENTS

| | | | | |
|---|---|---|---|---|
| 5,742,779 A | * | 4/1998 | Steele et al. ................ | 715/839 |
| 5,915,228 A | * | 6/1999 | Kunihiro et al. .......... | 455/575.1 |
| 6,047,197 A | * | 4/2000 | Jarrad ........................ | 455/566 |
| 6,073,036 A | * | 6/2000 | Heikkinen et al. ........ | 455/550.1 |
| 6,208,342 B1 | * | 3/2001 | Mugura et al. ............. | 715/810 |
| 6,259,447 B1 | * | 7/2001 | Kanetake et al. ........... | 715/764 |
| 6,452,614 B1 | * | 9/2002 | King et al. ................. | 715/775 |
| 6,512,525 B1 | * | 1/2003 | Capps et al. ................ | 715/762 |
| 6,542,812 B1 | * | 4/2003 | Obradovich et al. ........ | 701/207 |
| 6,600,936 B1 | * | 7/2003 | Karkkainen et al. ........ | 455/566 |
| 6,990,590 B2 | * | 1/2006 | Hanson et al. .............. | 713/194 |
| 2001/0056364 A1 | | 12/2001 | Diederiks et al. | |

FOREIGN PATENT DOCUMENTS

| | | |
|---|---|---|
| EP | 1 028 570 A1 | 8/2000 |
| EP | 1 104 151 A1 | 5/2001 |
| WO | WO 01/61443 A2 | 8/2001 |

OTHER PUBLICATIONS

Search Report established for FR 02 01565.

* cited by examiner

*Primary Examiner*—Marceau Milord
(74) *Attorney, Agent, or Firm*—Drinker Biddle & Reath LLP

(57) ABSTRACT

The mobile telecommunication apparatus (1) comprises a microphone (4), a loudspeaker (3), a transmitter/receiver (7), a control circuit (8) with a memory (9) and a control interface (5, 6) with a display (2). The mobile telecommunication apparatus (1) comprises in memory a collection of so-called personae (10) containing control and viewing parameters associated with each persona, a personae editor (11) designed for read/write access to the parameters of the said collection of personae, and an operating system (12) designed to be executed right from startup by the control circuit (8) in such a way as to drive the personae editor (11) so as to view a so-called main persona on the display (2).

11 Claims, 4 Drawing Sheets

FIG. 3

| | | | |
|---|---|---|---|
| A10 | F10 | | M10 |
| B11 | F11 | C11 | M11 |
| B12 | F12 | C12 | M12 |
| B13 | F13 | C13 | M13 |
| A20 | F20 | | M20 |
| B21 | F21 | C21 | M21 |
| B22 | F22 | C22 | M22 |
| B23 | F23 | C23 | M23 |
| A30 | F30 | | M30 |
| B31 | F31 | C31 | M31 |
| B32 | F32 | C32 | M32 |
| B33 | F33 | C33 | M33 |
| A40 | F40 | | M40 |
| B41 | F41 | C41 | M41 |
| B42 | F42 | C42 | M42 |
| B43 | F43 | C43 | M43 |

15  16  17  18

10

F 10

F 20

F 30

F 40

ANTHROPOMORPHIC MOBILE TELECOMMUNICATION APPARATUS

BACKGROUND OF THE INVENTION

The field of the invention is that of mobile telecommunication apparatuses. Numerous types of mobile telecommunication apparatuses are known, such as mobile telephones, personal organizers furnished with means of communication (PDA), portable microcomputers furnished with a modem which can be plugged into a mobile telephone.

More especially the field of the invention is that of the control of telecommunication apparatuses.

In the current state of the art, software devices are known which make it possible to adjust and to operate a mobile telephone for example of GSM type. Such devices implement an operating system for the mobile telephone which uses, on a man/machine interface, menus which are to a greater or lesser extent graphical and input templates based on a textual language such as French, English or any other language.

This interface is supplemented with a keypad, pointing devices, fast-access buttons which make it possible to operate and adjust the mobile telephone. Such devices are found on a personal organizer or a portable microcomputer. Adjustment interfaces exist which make it possible to adjust an analog value such as the ringing volume by modifying on the screen the representation of a bell (ringing symbol). A large size bell represents a loud ringing volume. A smaller size bell represents a lower ringing volume.

However, such menus generally comprise an appreciable share of text for describing functions to be carried out such as access to a directory, modification of the sound volume, diversion indicated entirely by letters, etc. Illiterate populations or those having none of the languages offered by the mobile telephone, may experience difficulties in using such devices efficiently.

SUMMARY OF THE INVENTION

A first object of the invention is to allow the use and the adjustment of a mobile telecommunication apparatus such as a mobile telephone, by providing a wholly graphical interface having no menu in the form of text, but in anthropomorphic or zoomorphic form. A second object of the invention is to render the interface of a mobile telephone or that of a personal organizer, more simple and intuitive to use.

A third object of the invention is to construct a simple access system, even for illiterate populations or those who speak uncommon languages.

The invention relates to a mobile telecommunication apparatus comprising a microphone, a loudspeaker, a transmitter/receiver, a control circuit with a memory and a control interface with a display. The mobile telecommunication apparatus is noteworthy in that it comprises in memory a collection of so-called personae containing control and viewing parameters associated with each persona, a personae editor designed for read/write access to the parameters of the said collection of personae, an operating system designed to be executed right from startup by the control circuit in such a way as to drive the personae editor so as to view a so-called main persona on the display.

Especially, the operating system is designed to receive from the personae editor, the control parameters adapted to drive the loudspeaker, the transmitter/receiver and/or the display.

Advantageously, the operating system is designed to send the persona editor orders received from the control interface so as to modify at least one control or viewing parameter for the said collection of personae.

Advantageously, at least one first viewing parameter relates to a state of brightness or of color of a portion of persona, at least one second viewing parameter relates to a shape of the same portion of persona, and the value of which can be modified by the persona editor according to the state to which the first viewing parameter relates.

Especially, the value of at least one first control parameter is dependent on the value of the second viewing parameter.

More especially, the persona editor is designed to go from a first subset of viewing parameters relating to a first portion of persona to a second subset of viewing parameters relating to a second portion of persona upon an order received from the control interface.

The mobile telecommunication apparatus is powerful in particular in terms of ergonomics, with a persona editor designed to go from a first set of viewing parameters relating to a first persona to a second set of viewing parameters relating to a second persona upon an order received from the control interface.

The mobile telecommunications apparatus is powerful in particular also in terms of ergonomics, with a persona editor designed to go from a first set of viewing parameters relating to a first persona different from the said main persona to a second set of viewing parameters relating to the said main persona upon the expiry of a timeout set by an order received from the control interface.

Advantageously, the operating system is designed to send the persona editor an event received from the transmitter/receiver and the persona editor is designed to position itself on a first set of viewing parameters relating to a persona representative of a context associated with the said event.

The mobile telecommunication apparatus is improved when it comprises in memory, a voice synthesis system controlled by the persona editor so as to transmit on the loudspeaker, a voice announcement which indicates the persona or the portion of persona to which the set or respectively the subset on which the persona editor positions itself relates.

The mobile telecommunication apparatus is improved also when it comprises in memory, a voice recognition system designed to position the persona editor on the set or the subset which relates to the persona or respectively the portion of persona which corresponds to a call of name received from the microphone by the said voice recognition system.

BRIEF DESCRIPTION OF THE DRAWINGS

The invention will be better understood with the aid of the exemplary embodiment whose description follows with reference to the appended drawings in which:

FIG. 3 shows an exemplary data structure for producing a collection of personae;

DESCRIPTION OF PREFERRED EMBODIMENTS

Figure 1:
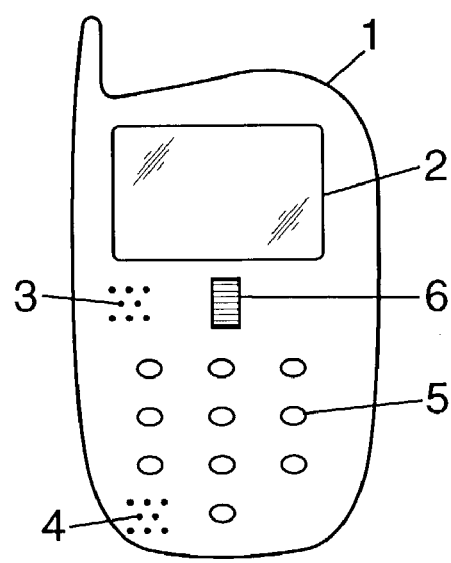
FIG. 1 shows a mobile telecommunication apparatus such as a mobile telephone.

With reference to FIG. 1, a mobile telecommunication apparatus is a mobile telephone 1. The mobile telephone 1 comprises a display 2 such as a graphics screen. A control interface comprises an alphanumeric keypad 5 or a thumbwheel 6. The mobile telephone 1 also comprises a loudspeaker 3 and a microphone 4. The loudspeaker 3 serves to transmit voice or ringing.

Figure 2:
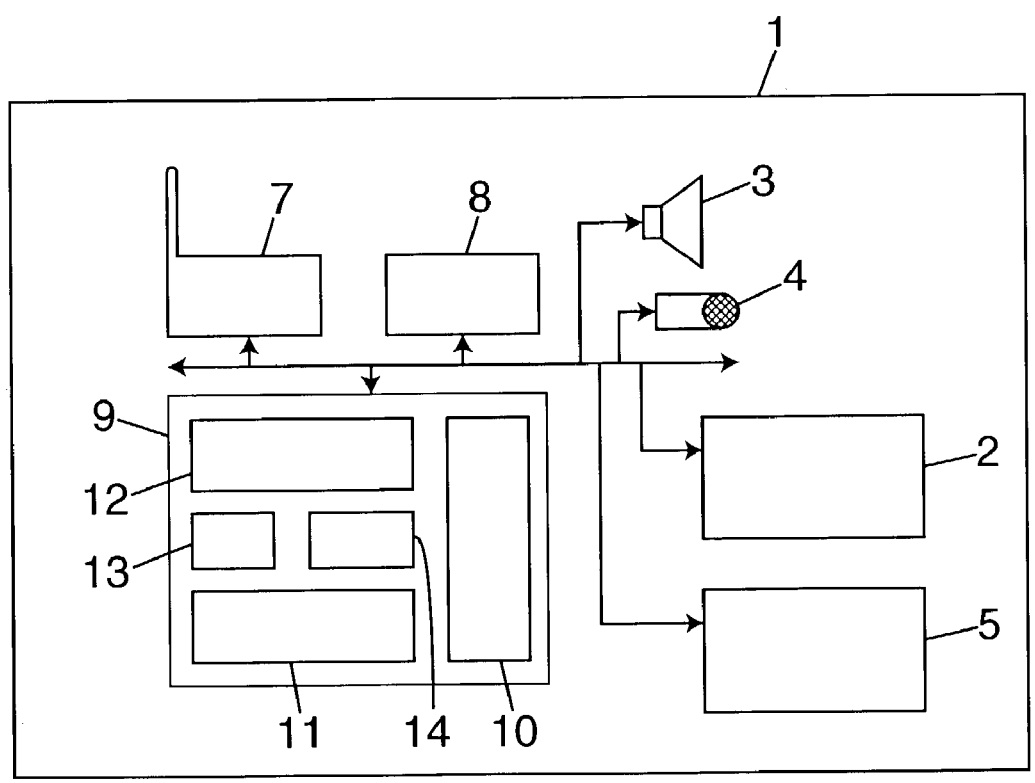
FIG. 2 shows a diagram of a mobile telecommunication apparatus in accordance with the invention.

With reference to FIG. 2, the mobile telephone 1 comprises a transmitter/receiver 7, a control circuit 8, a memory 9. By executing an operating system 12 contained in the memory 9, the control circuit 8 operates the transmitter/receiver 7, the loudspeaker 3, the microphone 4, the display 2, the control interface 5 and, advantageously, a personae editor 11 contained in the memory 9. In the memory 9, a collection of personae 10 contains control and viewing parameters associated with various personae. The personae editor 11 is designed for read and write access to the parameters of the collection of personae 10. The operating system 12 is designed to be executed right from startup of the mobile telephone 1. More especially, the operating system is designed to be executed by the control circuit 8 in such a way as to drive the personae editor 11 so as to view a so-called main persona on the display 2.

According to possible variant embodiments, the memory 9 also contains other software such as a voice synthesis system 13 and/or a voice recognition system 14.

With reference to FIG. 3, the collection of personae 10 is represented in the form of a data structure resident in memory 9. Seen there is a column 15 of first viewing parameters, a column 16 of second viewing parameters, a column 17 of control parameters and possibly a column 18 of voice announcement parameters. In columns 15 and 16 are stored sets of viewing parameters, each for a persona such as represented by way of nonlimiting example in FIG. 5.

Figure 5:
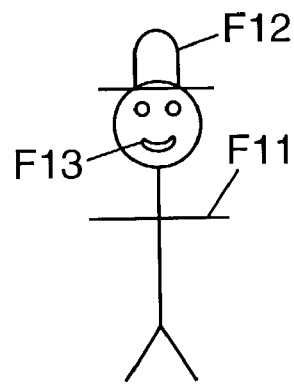
FIG. 5 shows examples of personae of a collection of possible personae.
Figure 5:
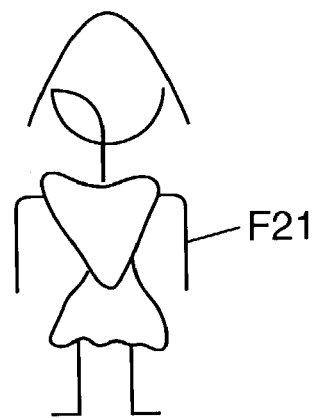
Figure 5:
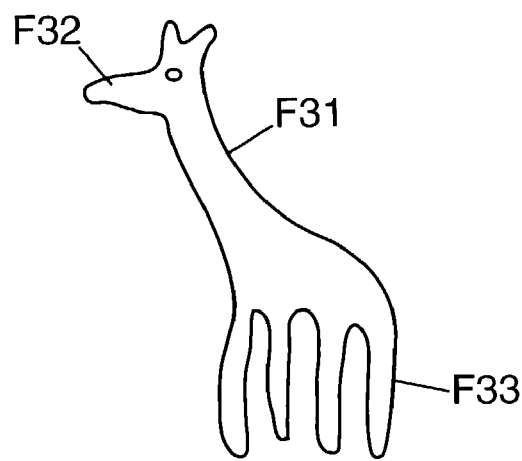
Figure 5:
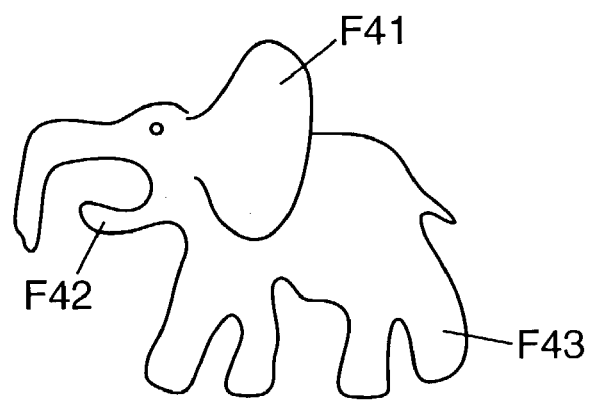

For example, a set of parameters F10 constitutes graphical data for describing a male human persona structure such as represented in FIG. 5. A subset F11 constitutes graphical data for describing a portion of this persona such as an arm in FIG. 5. A subset of parameters F12 constitutes graphical data for describing another portion of persona such as a hat in FIG. 5. Another subset of parameters F13 constitutes graphical data for describing yet another portion of persona such as a mouth in FIG. 5. Parameters B11, B12, B13 are respectively associated with the subset of parameters F11, F12, F13. The parameters B11, B12, B13 relate to a state of brightness or of color of the respectively associated portion of persona. A control parameter C11, C12, C13 is respectively associated with each shape parameter F11, F12, F13. By way of purely illustrative and nonlimiting example, the parameter C11 corresponds for example to a telephone call command, the parameter C12 corresponds to a telephone number modification or recording command, the parameter C13 corresponds to an incoming call pick-up.

For example, a set of parameters F20 constitutes graphical data for describing a female human persona structure such as represented in FIG. 5. A subset F21 constitutes graphical data for describing a portion of this persona such as an arm in FIG. 5. A subset of parameters F22 constitutes graphical data for describing another portion of persona such as a hat in FIG. 5. Another subset of parameters F23 constitutes graphical data for describing yet another portion of persona such as a mouth in FIG. 5. Parameters B21, B22, B23 are respectively associated with the subset of parameters F21, F22, F23. The parameters B21, B22, B23 relate to a state of brightness or of color of the respectively associated portion of persona. A control parameter C21, C22, C23 is respectively associated with each shape parameter F21, F22, F23. By way of purely illustrative and nonlimiting example, the parameter C21 corresponds for example to a telephone call command, the parameter C22 corresponds to a telephone number modification or recording command, the parameter C23 corresponds to an incoming call pick-up.

For example, a set of parameters F30 constitutes graphical data for describing an animal persona structure such as represented in FIG. 5 by a giraffe. A subset F31 constitutes graphical data for describing a portion of this persona such as a neck in FIG. 5, with by way of purely illustrative example, continuous values of extension of the neck. A subset of parameters F32 constitutes graphical data for describing another portion of persona such as a mouth in FIG. 5, with by way of purely illustrative example, "open mouth", "closed mouth" values. Another subset of parameters F33 constitutes graphical data for describing yet another portion of persona such as legs in FIG. 5. Parameters B31, B32, B33 are respectively associated with the subset of parameters F31, F32, F33. The parameters B31, B32, B33 relate to a state of brightness or of color of the respectively associated portion of persona. A control parameter C31, C32, C33 is respectively associated with each shape parameter F31, F32, F33. By way of purely illustrative nonlimiting example, the parameter C31 corresponds for example to an adjustment of sound volume of the loudspeaker 3 for telephone conversation listening, the parameter C32 corresponds to a command for accessing a telephone directory by scrolling personae of type described by the parameters F10, F11, the parameter C33 corresponds to a command for accessing other adjustment menus, to each of which there corresponds an animal persona. The giraffe constitutes for example a so-called main persona which can be displayed on the screen 2 as soon as the mobile telephone is made operational.

For example, a set of parameters F40 constitutes graphical data for describing an animal persona structure such as represented in FIG. 5 by an elephant. A subset F41 constitutes graphical data for describing a portion of this persona such as an ear in FIG. 5, with by way of purely illustrative example, continuous values of size of the ear. A subset of parameters F42 constitutes graphical data for describing another portion of persona such as a mouth in FIG. 5, with by way of purely illustrative example, "open mouth", "closed mouth" values. Another subset of parameters F43 constitutes graphical data for describing yet another portion of persona such as legs in FIG. 5. Parameters B41, B42, B43 are respectively associated with the subset of parameters F41, F42, F43. The parameters B41, B42, B43 relate to a state of brightness or of color of the respectively associated portion of persona. A control parameter C41, C42, C43 is respectively associated with each shape parameter F41, F42, F43. By way of purely illustrative nonlimiting example, the parameter C41 corresponds for example to an adjustment of sound volume of the loudspeaker 3 so as to transmit a ringing alarm, the parameter C42 corresponds to a command for placing in silent alarm mode, the parameter C43 corresponds to a command for placing in vibrate mode. The elephant constitutes for example a persona to which a menu for adjusting the mobile telephone corresponds.

According to one possible embodiment, the column 18 contains a set of parameters M10, M20 for proclaiming a voice message such as the name of a person corresponding to the persona respectively associated with the shape parameter F10, F20. A subset of parameters M11, M21 is intended to contain a voice message for proclaiming the portion of persona corresponding respectively to the parameter F11, F21. For example, depending on the state of the parameter F11, F21, a message associated with the parameter M11, M21 proclaims arm raised or arm lowered, or more explicitly the term "called". The parameters M12, M22 associated with the shape parameters F12, F22, are for proclaiming a message of the type "edit telephone number" or "record telephone number". The parameters M13, M23 associated with the parameters F13, F23 are envisaged for describing a sound message such as "Mr so-and-so is calling you" where so-and-so is the name of a person associated with the persona referenced by the parameters F10 to F13, respectively of a person associated with the persona referenced by the parameters F20 to F23.

According to this possible mode of embodiment, the column 18 contains a set of parameters M30, M40 for proclaiming a voice message such as the type of menu corresponding to the persona associated respectively with the shape parameter F30, F40. A subset of parameters M31, M41 is intended to contain a voice message for proclaiming the portion of persona corresponding respectively to the parameter F31, F41. For example, depending on the state of the parameter F31, F41, a message associated with the parameter M31, M41 proclaims "neck extended" or "bigger ear", or more explicitly the term "sound adjustment". The parameters M32, M42 associated with the shape parameters F32, F42 are envisaged for proclaiming a message of the type "call" or "silent mode". The parameters M43, M43 associated with the parameters F33, F43, are envisaged for describing a sound message such as "telephone adjustment", respectively "vibrate mode".

Advantageously, the parameters of the collection of personae 10 may be downloaded into the mobile telephone. For example, a series of male or female human personae, each persona being associated with a telephone number, allow a user of the mobile telephone to regard each persona as corresponding to a known person. Human personae available in memory can be envisaged for being associated with a person during a first incoming call on the mobile telephone.

Figure 4:
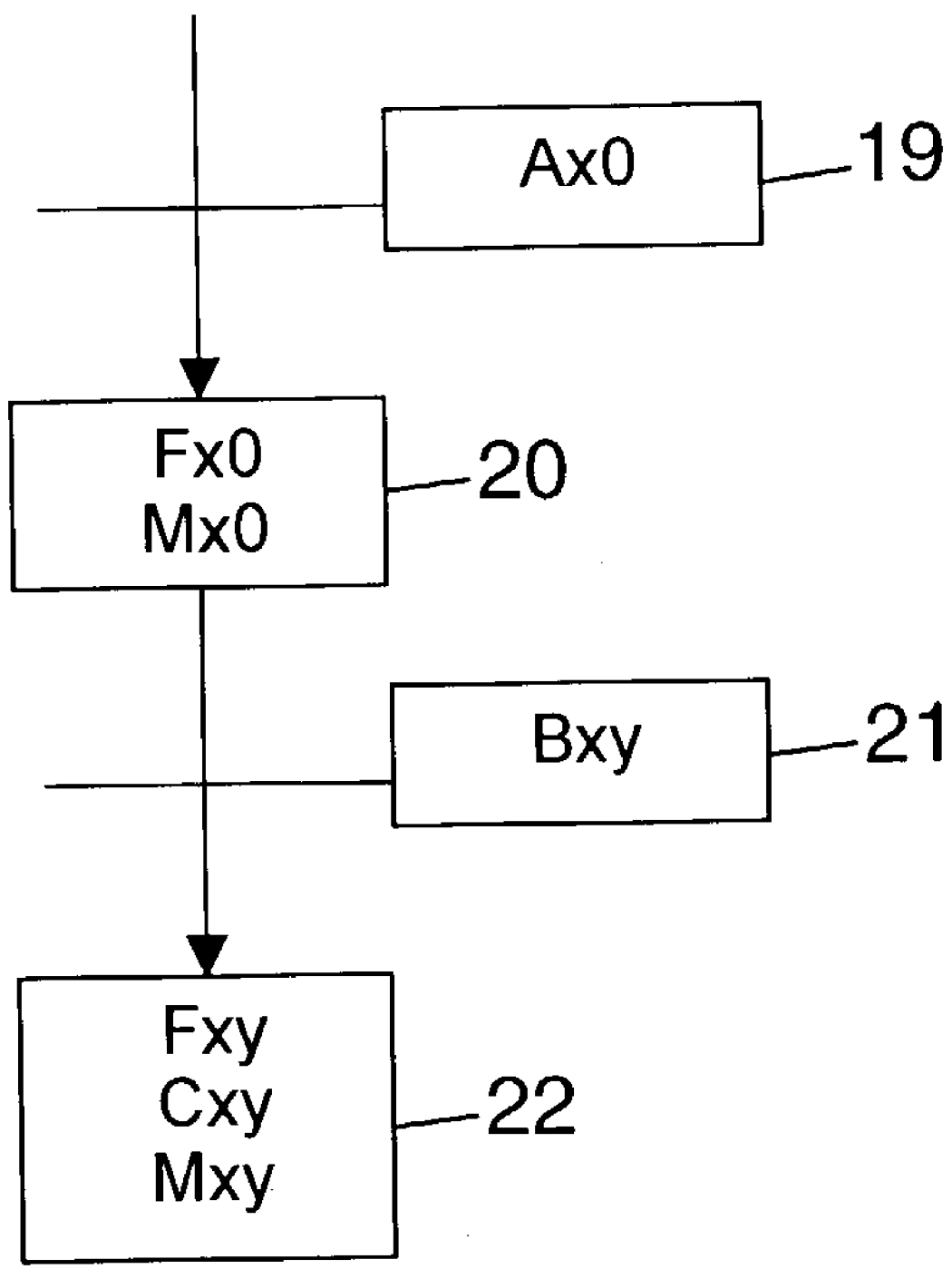
FIG. 4 shows steps of processes in accordance with the invention.

Steps of processes which can be executed by the personae editor 11 are now described with reference to FIG. 4.

In a transition 19, the personae editor 11 receives from the operating system 12, an address A10, A20, A30, A40, so as to position itself on the parameters of a persona of the collection of personae 10. The address denoted generally Ax0 in FIG. 4 is generated following an order received from the control interface 5 consisting of an alphanumeric keypad or more simply of the thumbwheel 6, from the voice synthesis system 13 or following an event generated for example by the transmitter/receiver 7.

In a step 20, the operating system sends the operating system 12 that one of the set of parameters F10, F20, F30, F40 corresponding to a persona to be displayed on the display 2. According to one possible embodiment, the associated parameter or parameters Mx0 are also sent to the operating system 12 so as to transmit a voice message on the loudspeaker 3.

A transition 21 is validated by a parameter reception denoted generally Bx0 for highlighting a portion of persona. This highlighting or modification of color of a portion of persona is controlled by the thumbwheel 6 or by a voice message received from the mike 4.

The transition 21 then activates a step 22. In step 22, the personae editor 11 sends the operating system 12 the subset of parameters Fxy corresponding to the highlighted portion of persona. According to one possible embodiment, the personae editor 11 also sends the operating system the parameters MXY for describing a voice message to be transmitted on the loudspeaker 3. Depending on whether the highlighting of a portion of persona corresponds to an order for modifying this portion of persona or to a command to be sent to the operating system, the personae editor 11 modifies the corresponding viewing parameter Fxy as well as the corresponding control parameter Cxy, or sends the operating system 12 the corresponding control parameter Cxy so as to drive a facility of the mobile telephone.

The operating system just described together with the personae editor is beneficial for any type of apparatus for which one wishes to allow adjustment by a person unable or hardly able to read messages in character mode. Such is the case for example for watches. A communicating watch worn on the wrist may for example constitute a mobile telecommunication apparatus while having all or some of the attributes of a mobile telephone properly speaking.

The invention claimed is:

1. A mobile telecommunication apparatus comprising a microphone, a loudspeaker, a transmitter/receiver, a control circuit with a memory and a control interface with a display, the mobile telecommunication apparatus comprising in memory:
    a collection of graphical personae containing control and viewing parameters associated with each persona,
    a personae editor designed for read/write access to the parameters of the said collection of graphical personae,
    an operating system designed to be executed right from startup by the control circuit in such a way as to drive the personae editor so as to view a main persona on the display.

2. The mobile telecommunication apparatus according to claim 1, wherein the operating system is designed to receive from the personae editor, the control parameters adapted to drive the loudspeaker, the transmitter/receiver and/or the display.

3. The mobile telecommunication apparatus according to claim 1, wherein the operating system is designed to send the personae editor orders received from the control interface so as to modify at least one control or viewing parameter for the said collection of personae.

4. The mobile telecommunication apparatus according to claim 3, wherein the personae editor is designed to go from a first set of viewing parameters relating to a first persona to a second set of viewing parameters relating to a second persona upon an order received from the control interface.

5. The mobile telecommunication apparatus according to claim 4 comprising in memory, a voice synthesis system controlled by the personae editor so as to transmit on the loudspeaker, a voice announcement which indicates the persona or the portion of persona to which the set or respectively the subset on which the personae editor positions itself relates.

6. The mobile telecommunication apparatus according to claim 4 comprising in memory, a voice recognition system designed to position the personae editor on the set or the subset which relates to the persona or respectively the portion of persona which corresponds to a call of name received from the microphone by the said voice recognition system.

7. The mobile telecommunication apparatus according to claim 3, wherein the personae editor is designed to go from a first set of viewing parameters relating to a first persona different from the said main persona to a second set of viewing parameters relating to the said main persona upon the expiry of a timeout set by an order received from the control interface.

8. The mobile telecommunication apparatus according to claim 1, wherein at least one first viewing parameter relates to a state of brightness or of color of a portion of persona, at least one second viewing parameter relates to a shape of the same portion of persona, and the value of which can be modified by the personae editor according to the state to which the first viewing parameter relates.

9. The mobile telecommunication apparatus according to claim 8, wherein the value of at least one first control parameter is dependent on the value of the second viewing parameter.

10. The mobile telecommunication apparatus according to claim 8, wherein the personae editor is designed to go from a first subset of viewing parameters relating to a first portion of persona to a second subset of viewing parameters relating to a second portion of persona upon an order received from the control interface.

11. The mobile telecommunication apparatus according to claim 1, wherein the operating system is designed to send the personae editor an event received from the transmitter/receiver and in that the personae editor is designed to position itself on a first set of viewing parameters relating to a persona representative of a context associated with the said event.

* * * * *